Fig. 10

OPTICAL DATA

| ELEMENT | RADIUS-1 | RADIUS-2 | THICKNESS | OUTSIDE DIAMETER | FREE APERTURE-1 | FREE APERTURE-2 |
|---|---|---|---|---|---|---|
| 1 | +16.700 | -1.516 | .070 | 1.958 | 1.878 | 1.752 |
| 2 | +1.516 | +7.115 | .650 | 1.958 | 1.752 | 1.600 |
| 3 | -7.115 | -2.100 | .070 | 1.650 | 1.600 | 1.478 |
| 4 | -3.650 | -6.482 | .0875 | 1.650 | 1.474 | 1.474 |
| 5 | +2.894 | +2.434 | .350 | 1.710 | 1.630 | 1.618 |
| 6 | -2.6603 | -1.912 | .070 | 1.710 | 1.602 | 1.560 |
| 7 | +2.434 | +2.258 | .400 | 1.710 | 1.560 | 1.562 |
| 8 | +1.720 | -10.542 | .1925 | 1.496 | 1.416 | 1.376 |
| 9 | -2.434 | +.775 | .135 | .7812 | .654 | .614 |
| 10 | -.775 | -2.0187 | .035 | .7812 | .614 | .558 |
| 11 | ∞ | ∞ | .625×.420 | | | |
| 12 | +1.280 | +2.883 | .220 | .9200 | .738 | .748 |
| 13 | -1.818 | -1.190 | .400 | .9200 | .744 | .820 |
| 14 | +4.001 | +1.664 | .230 | 1.0900 | .886 | .950 |
| 15 | +1.664 | +12.853 | .190 | 1.0900 | 1.010 | 1.008 |

Fig. 11

Nov. 28, 1967  L. A. SMITZER ET AL  3,354,776
MICROFILM READER

Filed Nov. 20, 1964  11 Sheets-Sheet 11

INVENTORS
Louis A. Smitzer
Andrew I. Yohana
Daniel D. Call

ATTORNEYS

United States Patent Office 3,354,776
Patented Nov. 28, 1967

3,354,776
MICROFILM READER
Louis A. Smitzer, Chicago, Andrew I. Yohana, Skokie, and Daniel D. Call, Elk Grove, Ill., assignors to Bell & Howell Company, Chicago, Ill., a corporation of Illinois
Filed Nov. 20, 1964, Ser. No. 412,620
18 Claims. (Cl. 88—24)

ABSTRACT OF THE DISCLOSURE

A high-speed microfilm reader is disclosed having an optical system incorporating a continuous zoom lens and a dove prism, thereby affording selected magnification from 20× to 40× and continuous image rotation through 360 degrees. The reader is adapted to receive a no-rewind-type cartridge loaded with roll microfilm and to drive the film therethrough at variable speeds. Through electromagnetic clutches, the film may be selectively driven at a slow scanning rate by a low-speed motor and at variable higher speeds by a high-speed motor having low- and high-speed windings. The improved cartridge has an aperture plate integral therewith so that the cartridge may be removed from the reader and replaced by another cartridge with the film at any position without the need to rewind or thread the film. The film ends are attached to the spindles by two-piece hubs having centers spaced less than twice the radial dimension of the accumulated film. Each of the hubs is comprises of an inner core having a flat side and a C-shaped shell with a complementary flat portion for clamping the film between the core and shell.

---

This invention relates generally to information storage and retrieval methods and apparatus and more specifically relates to a high speed retrieval device which features the utilization of a no-rewind cartridge eliminating an operator's need to thread film or to rewind the film after reference has been made to any given document appearing in the form of a micro image on the film and further characterized by the utilization of a continuously variable zoom lens system whereby the magnification of an image may be varied from 20× to 40× while precision focus is maintained throughout the entire range.

Briefly described, it is contemplated by the present invention that there be utilized in a microfilm reader a cartridge comprising an integral container providing its own film aperture plate and in which a spool of mirofilm can be stored or used merely by snapping the cartridge over the spindles of the reader transport apparatus. By keeping the film in the cartridge, the two hubs of the cartridge may be spaced apart less than twice the radial dimension of the accumulated film. Thus, there is completely eliminated any necessity for the operator to thread the film or to rewind the film after reference has been made to any specific micro image on the film. Moreover, the integral cartridge container offers positive protection of the film. In actual usage, cartridges hold as much as 170 feet of .003 film which never leaves the cartridge.

It is also contemplated that the reader of the present invention utilize a continuously variable zoom lens system for varying the magnification of an image from 20× to 40× and maintaining precision focus throughout. Thus, lens changes for images recorded at different reduction ratios are completely eliminated and by the provision of finger tip control, the operator can adjust to an image of any reduction of magnify hard to read film.

The lens system of the present invention is also characterized by the utilization of a dove prism whereby the image can be rotated a full 360° at any time. Brightness control is used to compensate for varying line voltage and for variable magnification.

It is an object of the present invention, therefore, to provide an improved high speed retrieval device for use in retrieving and looking up micro images recorded on spooled microfilm.

Another object of the present invention is to provide a no-rewind cartridge for a microfilm reader.

Yet another object of the present invention is to provide a cartridge affording selected reverse traverse in either direction in a minimum length of time, thereby contributing to speedy look-up of retrieved micro image material.

A still further object of the present invention is to provide a reader with a continuously variable zoom lens system.

Still another object of the present invention is to provide a lens system for a microfilm reader wherein the image in the screen can be rotated a full 360° at any time.

Yet another object of the present invention is to provide variable illumination for a microfilm reader, thereby contributing to additional operator comfort.

Many other features, advantages and additional objects of the present invention will become manifest to those versed in the art upon making reference to the detailed description which follows and to the accompanying sheets of drawings in which preferred structural embodiment of a reader incorporating the principles of the present invention is shown by way of illustrative example.

The reader of the present invention is shown generally at 20 and comprises a cabinet 21 having a top wall 22, opposed side walls 23, a rear wall 24 and a front wall 26, as well as a bottom wall 27.

The front wall 26 is particularly characterized by a frame forming an opening in which is positioned a screen 28 comprising a dark green plastic sheet with one side polished and one side matte surface. Although the screen 28 may be mounted with the matte side in or out, it is frequently used in practice with the matte side in, thereby avoiding any trace of a ghost image which may appear because of a light reflection from the polished side back into the optical track and thence by reflection back to the screen.

A hood 29 projects forwardly from the front wall 26, thereby providing appropriate shielding for the screen 28.

Projecting from the front wall 26 below the level of the screen 28 is an enclosure or housing shown generally at 30. The housing 30 has a bottom wall 31 and a top wall 32 which forms a control deck for receiving and positioning a no-rewind cartridge provided in accordance with the principles of the present invention and shown generally at 33. The forwardmost wall of the housing 30 constitutes a hinged door 34 connected by hinges 36 to the bottom wall 31, thereby affording access to the interior of the housing 30.

The deck 32 terminates in an offset vertically extending wall 37, thereby forming an enlarged recess for a lens system shown generally at 38. A horizontally extending wall 39 terminates in an inclined fascia strip 40 adapted to carry the indicia of an index system shown generally at 41.

Figure 2:
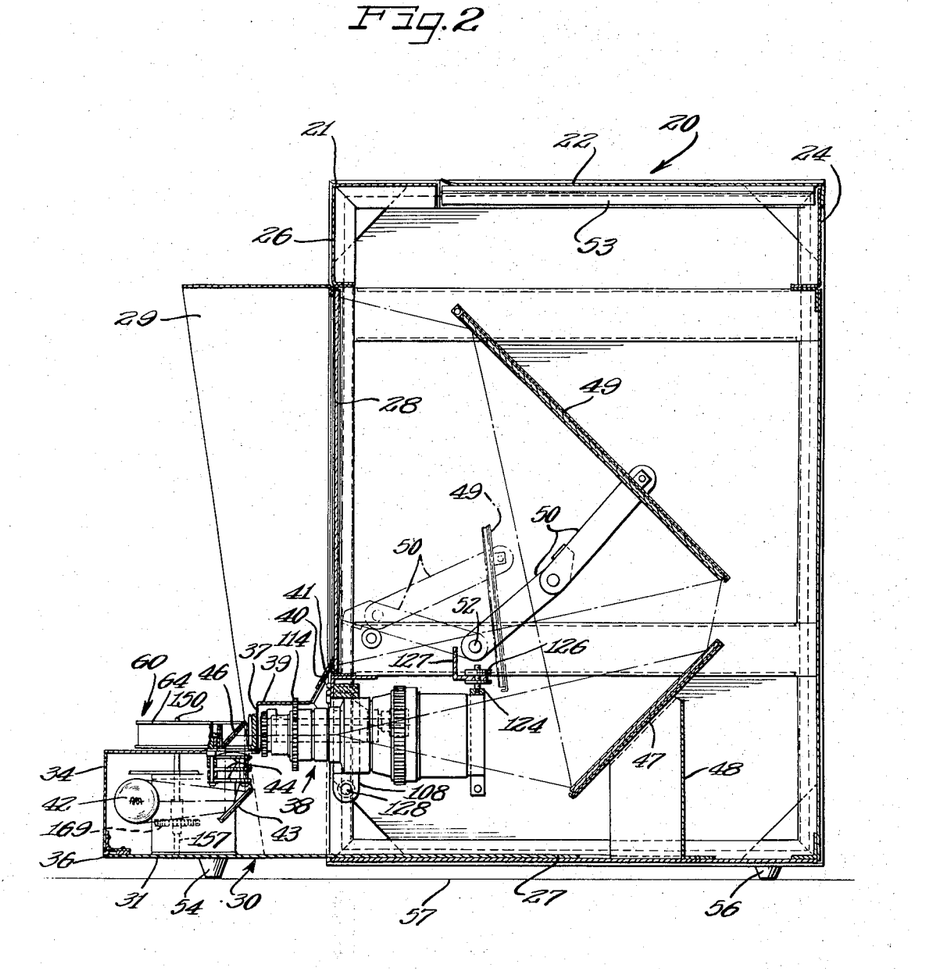
FIGURE 2 is a cross-sectional view taken on line II—II of FIGURE 1.

An electric light source 42 is shown in the housing 30 near the access door 34 and projects rays of light against an angularly inclined mirror 43 which is in register with lenses shown at 44. A light source mirror 46 is angularly inclined and projects upwardly from the deck 32 in register with the lenses 44, thereby to project the light forwardly towards the vertical wall 37 and through the lens system 38. The light then impinges upon a mirror 47 carried on a bracket 48 mounted within the interior of the cabinet 21. From the mirror 47, the light is projected against another angularly inclined movable mirror 49 which is positioned by means of a linkage 50 between a full line position and a dotted line position, as shown in FIGURE 2 by means of an actuating handle 51 having a pivot axle 52 projecting out of one of the side walls 23.

When the mirror 49 is in the full line position, the light is projected onto the back of the screen 28 for viewing by the operator.

Facsimile copy may be prepared by swinging the handle 51 towards the operator, whereupon the mirror 49 will be pivoted out of the way and the light will then be projected to a glass platen 53 on the top of the machine which may constitute the image plane of any copying apparatus.

It will be noted that the bottom wall 31 of the housing 30 is provided with spaced feet 54 and the bottom wall 27 of the cabinet 21 is provided with spaced feet 56, thereby to firmly support the reader 20 on any suitable support surface such as a table top herein shown at 57.

Figure 3:
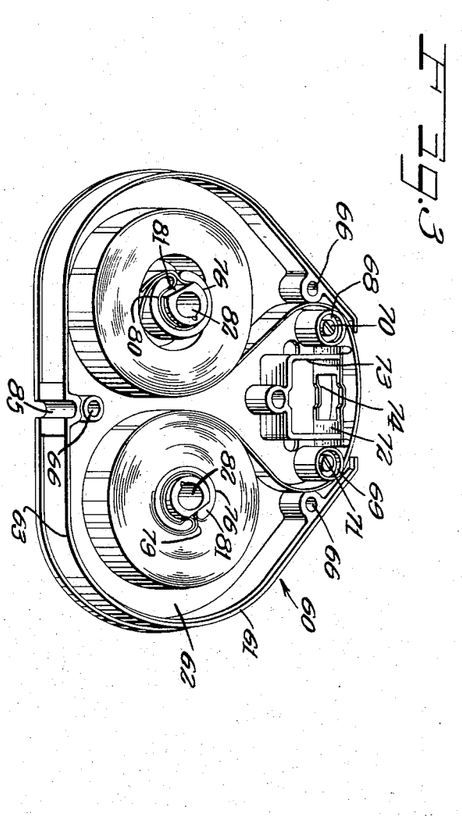
FIGURE 3 is a perspective view of the no-rewind cartridge of the present invention with the cover removed to illustrate additional details of construction.
Figures 4, 4A:
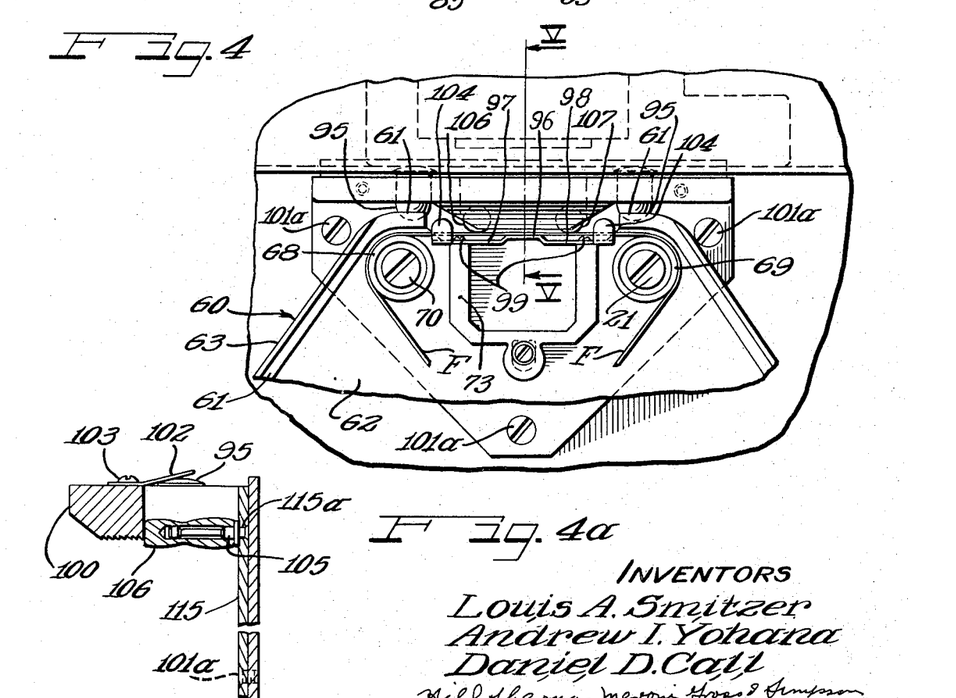
FIGURE 4 is an enlarged fragmentary plan view and FIGURE 4a is a fragmentary side sectional view of the cartridge of FIGURE 3 positioned on the loading deck of the reader and illustrating additional details of construction of the no-rewind cartridge.

In accordance with the principles of the present invention, it is contemplated that there be utilized with the reader 20 a no-rewind cartridge which affords speed, simplicity and security to the utilization of microfilm storage retrieval and viewing since the cartridge eliminates the need to thread film and to rewind the film after any specific document has been retrieved. The cartridge of the present invention is shown generally at 60 and comprises essentially a body 61 (FIGURE 3) including a bottom wall 62 and upstanding side walls 63. A cover 64 is snap-removable on the body 61 without the use of tools and to effect that end, the body is provided with a plurality of sockets 66 arranged to receive mating snap-in pins carried by the cover member 64.

In overall configuration, the body is somewhat triangular in appearance but having rounded corners adjacent the base leg. At the upper apical portion of the cartridge, there is provided a pair of spaced guide rollers 68 and 69 journaled on appropriate pin axles shown at 70 and 71 respectively. Extending generally across the area between the guide rollers 68 and 69 there is formed an aperture plate shown generally at 72. Extending rearwardly from the aperture plate 72 and into the interior of the cartridge 60 is a frame 73 which is adapted to receive the light source mirror 46 for projection of the light rays through the aperture 74 formed on the aperture plate 72.

Figures 5, 6:
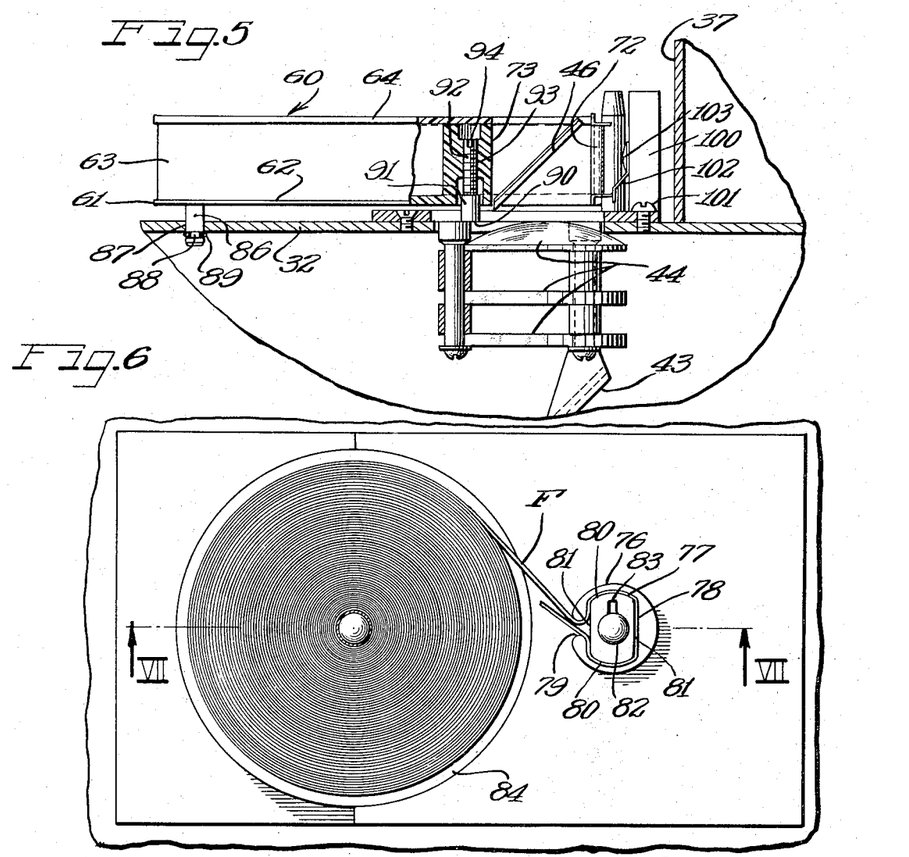
FIGURE 5 is a fragmentary cross-sectional view with parts shown in elevation taken generally on line V—V of FIGURE 4.
FIGURE 6 is a fragmentary view illustrating how conventionally spooled film may be reloaded in the cartridge of the present invention.

The body 61 contains two loose cores and shells for attaching the ends of the film. More specifically, the core and shell construction is illustrated in FIGURE 6 taken in conjunction with FIGURE 3. It will be noted that the outer shell, designated at 76, constitutes a generally C-shaped article having an inner core-receiving recess 77 formed with a flat chordal wall 78 at the bight portion of the C-shaped article opposite an opening 79 formed between the opposed spaced ends of the shell 76.

The core member has curved end walls 80 and flat side walls 81, as well as a central bore 82 formed with a key notch 83 on one side for cooperative engagement with a spindle.

In order to attach the end of the film to the core and shell, the free end of a film, herein shown at F, is merely looped around the core walls 80, 81 whereupon the C-shaped shell 76 is slid over the outside of the wrapped film end, thereby clamping the end of the film in firm assembly with the core.

The cover 64 as well as the lower wall 62 of the cartridge 60 is appropriately relieved to provide a piloting location for the core and shell.

In order to load film into a cartridge 60, as provided in accordance with the principles of the present invention, three methods may be used. Either the cartridge may be loaded at the reader from standard spools of film, or the cartridge 60 may be loaded at the reader 20 from film prewound on cores by a process station or, lastly, the cartridge 60 may be loaded at the process station and supplied to the user.

Figure 7:
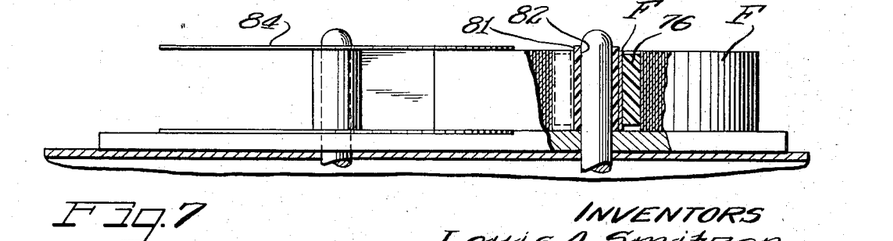
FIGURE 7 is a fragmentary cross-sectional view taken generally on line VII—VII of FIGURE 6.

For winding at the machine, a winding disk, as shown in FIGURES 6 and 7, at 84 is provided which winding disk 84 is placed over one of the spindles. A spool of film F is placed on the left-hand spindle after verifying readability of the image by projecting while the film is held against the rollers 68 and 69. After determining readability, the spool is placed over the left-hand spindle and the end of the film is attached directly to the core 80, 81 by use of the shell 76 on the right-hand spindle. The film may then be wound onto the core and shell at high speed whereupon the film and empty spool are then lifted from the spindles and separated and the coiled film is placed on the right side of a cartridge body 61. At this point, if the film F were unwound, it would unwind clockwise from the left side of the coil. The film then threaded through the aperture plate 72, attached to a core and shell and placed on the left side of the cartridge. The cover is then snapped in place and the cartridge is then ready for either storage or retrieval and usage with the reader 20. If it is desired to rewind the film back to a spool, the process is reversed.

It will be understood that if the film is wound at a process station, it must be attached to a core and shell and wound properly for insertion on the right-hand spindle and the loose end may then be attached to a second core.

In order to mount the cartridge 60 in proper alignment on the deck 32, two dowel pins are utilized. A first dowel pin is shown at 86 (FIGURE 5) and is located in an aperture 87 formed in the deck 32, the lower end of the dowel pin 86 being press fitted and riveted as at 88, to lock the dowel pin in a fixed position. The upper end of the pin 86 engages the walls of a locating recess 85 formed in the cartridge 60.

The second dowel pin is shown at 91 and is characterized by the provision of a threaded stem 92 which threadedly engages the internally threaded walls of a boss 93 formed in the cartridge body 61. The end of the threaded portion of the dowel pin has a socket as at 94 to permit adjustment by an appropriate tool such as a Bristol wrench. The other end forms an abutment surface 90 and engages the deck 32. By virtue of such provision, the cartridge may be properly aligned so that the aperture 74 of the aperture plate 72 is in proper register with the light source mirror and housing assembly 46 and the lens system 38.

It will be noted that the aperture plate 72 has a central embossed portion 96 and two oppositely extending retainer wings 97 and 98 provided with appropriate apertures so that a fastener 99 such as a crew may be extended through the retainer wings 97 and 98 to fasten the apertures plate 72 in firm assembly with the frame 73 of the cartridge body 61.

The peripheral surface of the guide rollers 68 and 69 lies in planar alignment with the surface prescribed by the embossment 96 so that the film when trained over the guide rollers 68 and 69 will be disposed in proper planar alignment and with minimum surface contact at the plane of the aperture plate 72.

To insure proper disposition of the film F in the film plane, the deck 32 carries a bracket 100 retained to the deck 32 by means of a pair of fasteners such as screws 101. The bracket 100 carries a pair of spaced leaf springs 102, 102, each connected to the bracket 100 by a screw fastener 103. The springs 102 retain pins 95 which resiliently engage the front wall of cartridge body 61. Two studs 105 are located in an aperture 115a formed in a plate 115 fastened to the deck 32 by screws 101a, the lower end of the studs being press fitted and riveted to lock the studs in a fixed position. An upstanding roller 106 projects upwardly from the flange of stud 105 and is situated opposite the recess formed between the embossment 96 and the extension 97 and a second roller 107 is similarly situated opposite the recess formed between the embossment 96 and the extension 98 of the aperture plate 72. The peripheral surfaces of the rollers 106 and 107 are in planar alignment and are so situated relative to the plane prescribed by the embossment 96 as to further assist in holding the film F in proper position relative to the light source mirror 46 and the lens system 38.

Figure 8:
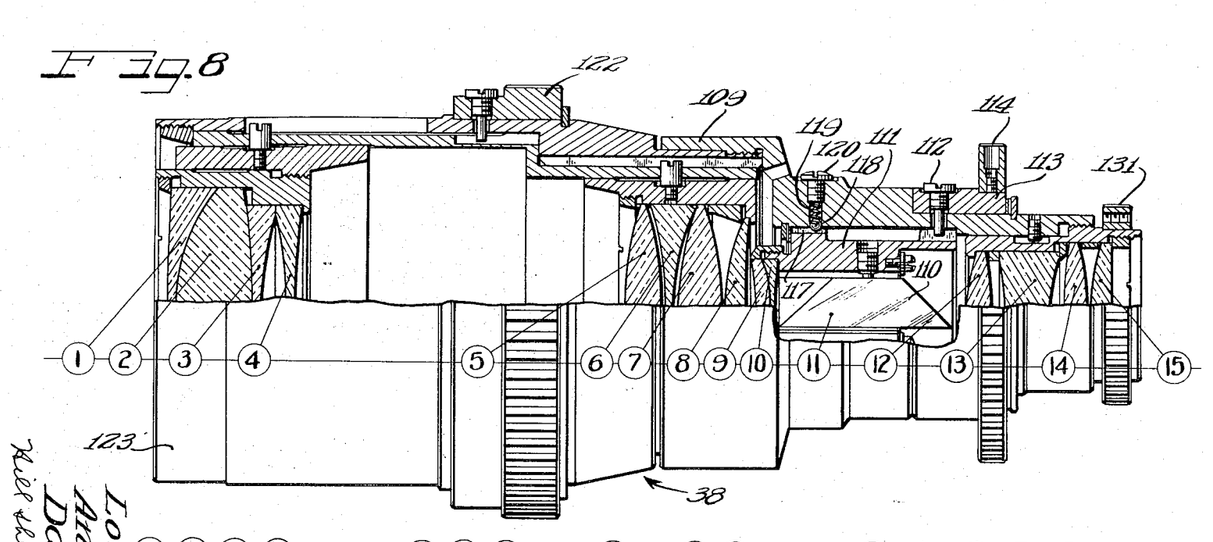
FIGURE 8 is a cross-sectional view of the lens system provided in accordance with the principles of the present invention.
Figure 9:
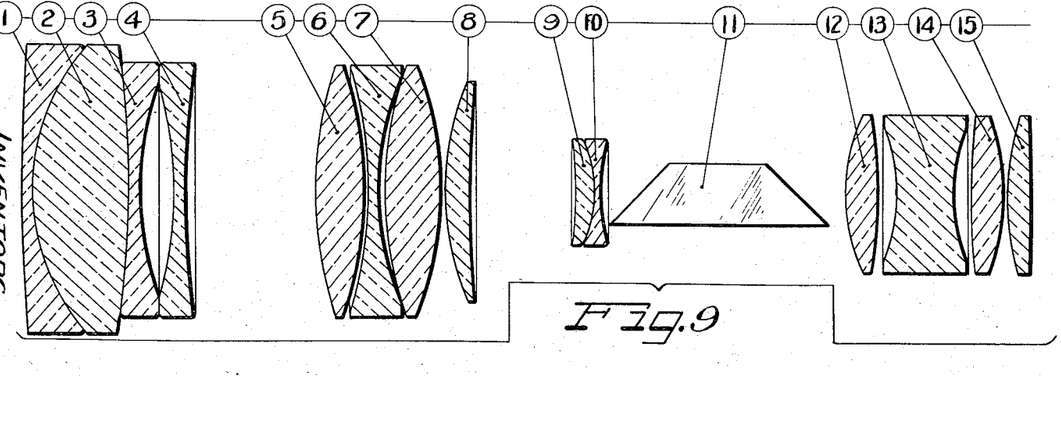
FIGURE 9 is an exploded view illustrating the components of the continuous variable magnification zoom lens.

After a cartridge 60 is placed on the deck 32 and the film F is trained over the aperture plate 72, any micro images appearing on the film in register with the aperture plate will be projected into the lens system 38. The details of the lens system are illustrated in FIGURES 8 and 9 and will be understood in conjunction with a comparison to FIGURE 2. A mounting bracket 108 is securely fastened to the cabinet 21 and embraces a generally cylindrical housing 109 in which are located the various lens elements of the lens system.

It is contemplated by the present invention that any image may be rotated 360° and that the control for effecting such image rotation be located at the front of the reader convenient to the ready access of the operator. To effect such image rotation, there is provided an internal prism shown at 110 and comprising a so-called "dove" prism mounted in a carrier 111 keyed as at 112 to a rotatable adjustment ring 113 having a knurled actuator portion 114 which extends upwardly through an aperture 116 formed in the horizontal wall 38 at the center of the machine. The carrier has pin and recess detent means affording four click stops for each 90° of image rotation and it will be noted that the carrier 111 has a recess 117 in which is received a ball 118 spring-loaded by a continuous biasing means such as a coil spring 119, the other end of which is bottomed against a screw 120.

The single lens assembly 38 contains focus, image rotation and zoom, or variable magnification. The zoom adjustment knob is shown at 121 at the left-hand side of the control panel on the vertical wall 37. The knob 121 is drivingly connected either by gearing or an appropriate belt assembly to an adjustment ring 122 which is in control of the axially adjustable components of the optical elements. The various lens members are carefully aligned and locked in the housing 109 in the factory and are not ordinarily adjusted in the field except insofar as the movable element of the zoom lens combination is adjustably moved in use.

It is contemplated that the variable magnification or zoom range will be from 20× to 40× and a square image is produced on the screen 28 at a magnification of 24×. It has been found in practice that a distortion of less than plus or minus 4% is evidenced at each end of the range using a variable magnification lens system of 20× to 40×.

Figure 10:
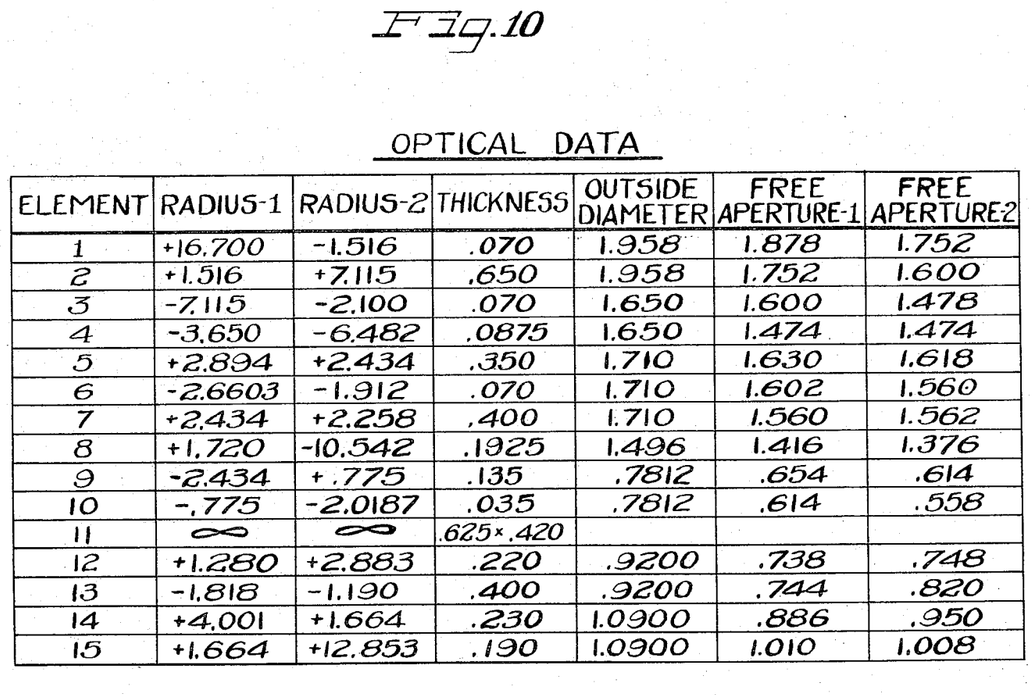
FIGURE 10 is a chart identifying the optical data of the lenses illustrated in FIGURES 8 and 9.

To identify a typical lens combination, a chart of optical data is set forth in FIGURE 10 and each of the corresponding elements identified in that chart is referred to by a corresponding number in FIGURE 9 wherein the lens elements are shown removed from the lens assembly for purposes of ready identification.

Because of the size of the total lens assembly, the end of the housing is recessed at 123, thereby providing a mount received in a ring band 124 carried by lock nut adjustment means shown generally at 126 (FIGURE 2) fastened to an appropriate bracket 127 in the cabinet 21. The bracket 108 may be pivotally carried on a pivot pin 128, thereby permitting the lens assembly to be properly mounted in the cabinet 21 for optical prealignment relative to the remainder of the optical track including the mirrors 43, 44, 47 and 49.

In order to effect focusing of the lens assembly 38, a focus knob 130 is located on the control panel on the righthand side of the vertical wall 37 and has a driving connection via a belt drive to a focus ring 131. Focus is accomplished by rotating the knob 130, thereby screwing the prime lens in or out. Ordinarily, it should not be necessary to refocus when switching cartridges 60 unless emulsions on the film F are on opposite sides.

Film movement is controlled by a control knob 132 on the right-hand side of the machine projecting upwardly from the deck 32 at the control panel, a control dial 133 being situated on the deck 32 circumjacent the knob 132. Although the knob and control dial may be positioned with "off" at either 12, 3, 6 or 9 o'clock, a standard arrangement is to locate the "off" position at 12 o'clock when viewed from the top. Thus, when oriented for horizontal motion, movement of the knob 132 to the left (counterclockwise) will move the screen image to the left and, vice versa, movement of the knob 132 to the right (clockwise) will move the screen image to the right.

The control dial 133 is symmetrical about the "off" position and preferably is calibrated in terms of a low variable speed, a stop, and a high speed. The low speed is slow enough to afford easy readability of the image on the screen, whereas at high speed, the film F will be transported at such a rate as to move approximately 100 feet of film in about 15 seconds.

Figure 1:
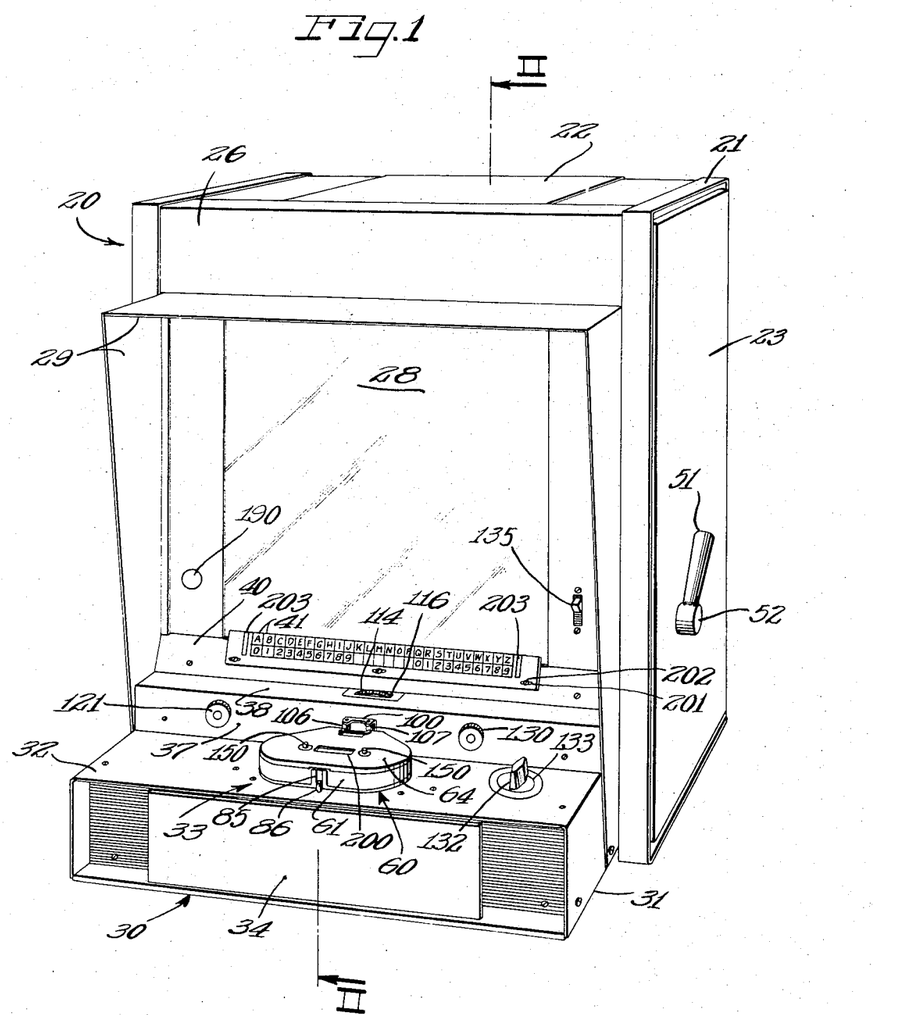
FIGURE 1 is a perspective view of a reader incorporating the principles of the present invention.
Figure 11:
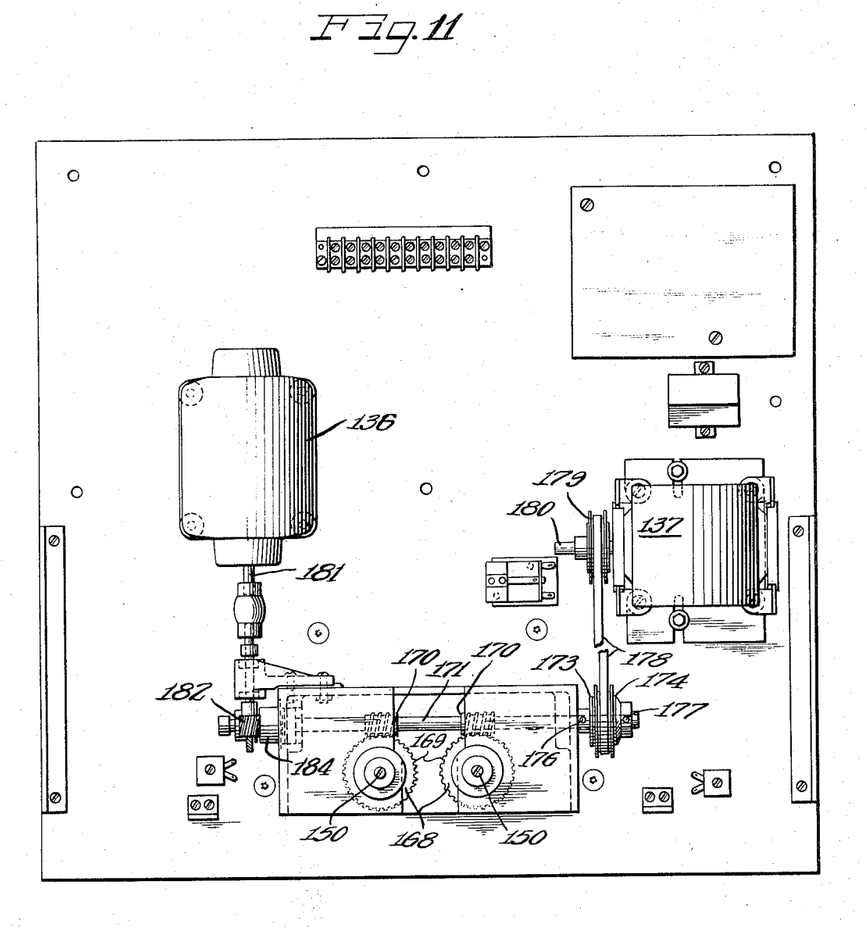
FIGURE 11 is a top plan view with parts broken away showing the motor drive system for the film transport apparatus incorporated in the reader of FIGURE 1.
Figure 12:
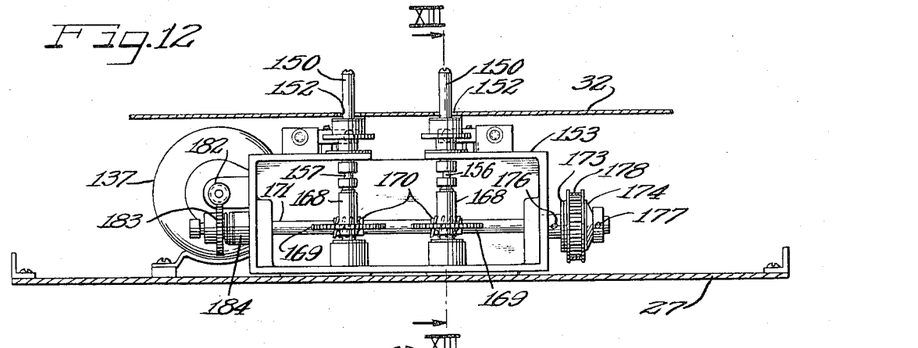
FIGURE 12 is a side elevational view of the mechanism of FIGURE 11.
Figure 13:
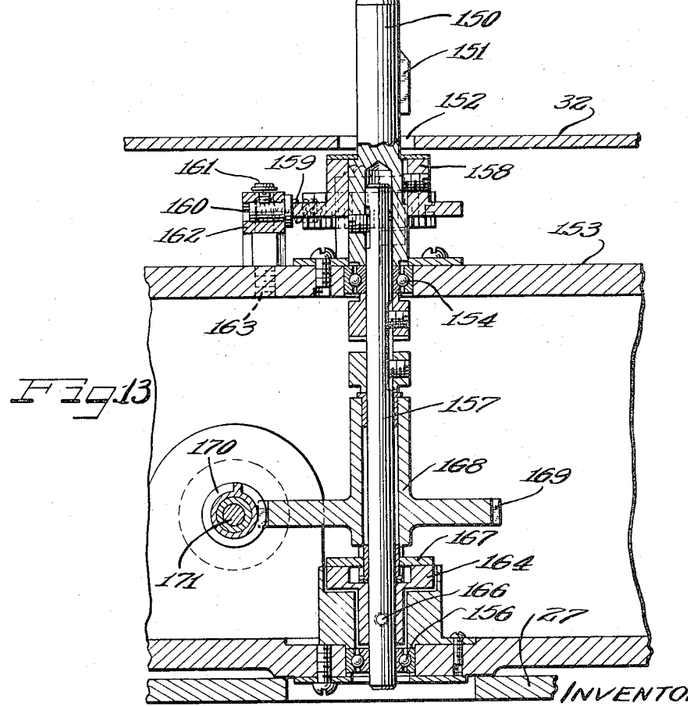
FIGURE 13 is a somewhat enlarged cross-sectional view taken generally on line XIII—XIII of FIGURE 12.
Figure 14:
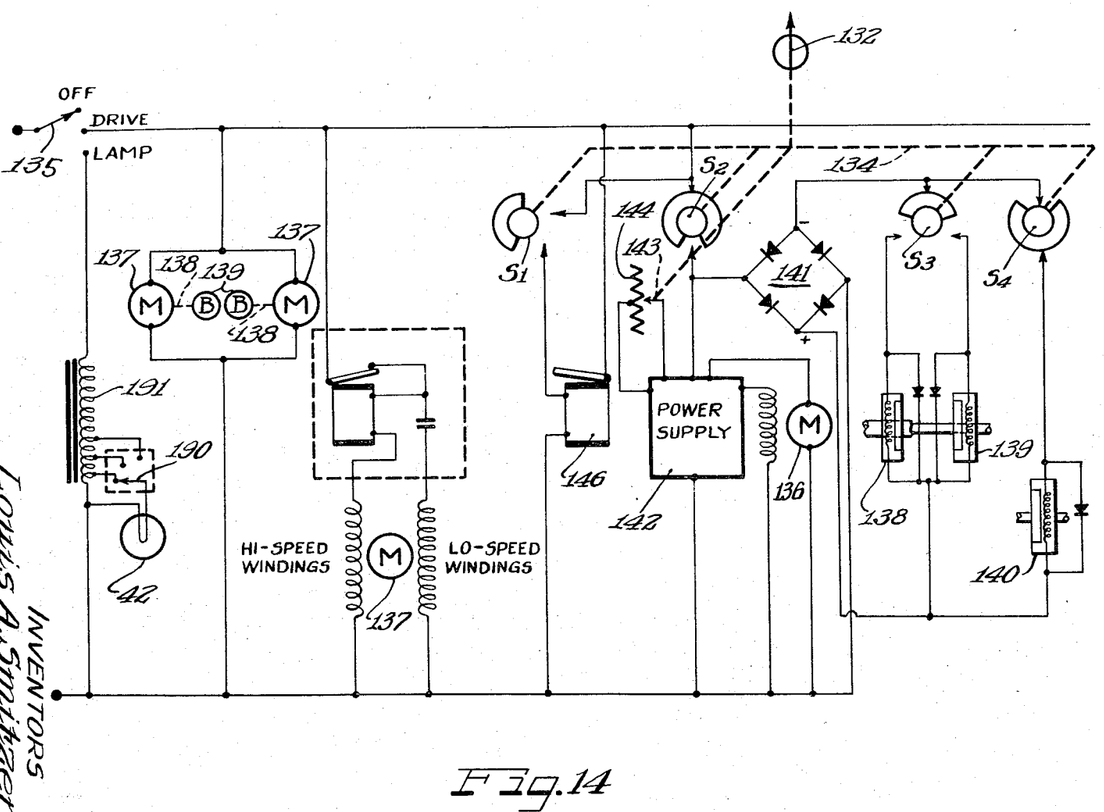
FIGURE 14 is a schematic wiring diagram illustrating the control circuitry for the reader of the present invention.

Referring to FIGURES 11-13 in conjunction with the schematic wiring diagram of FIGURE 14, it will be noted that the machine is provided with an on-off switch 135, shown located on the right-hand side of the front wall 26 in FIGURE 1. The switch 135 has three positions, an off position, a drive position and a lamp position. In the off position, it will be noted the circuitry to the power source is broken and none of the control components of the reader 20 are energized.

In the so-called drive position, the power source is energized and it will be noted there is provided a pair of motors 137, 137 each connected by a suitable driving connection 138 to a corresponding fan or blower 139. The motor-blower units 137, 138, 139 are suitably situated within the cabinet 21 and are used to circulate a stream of cooling air through the cabinet and particularly the housing 30 in order to remove heat generated by the light source 42.

The single control knob 132 operates to provide the mechanical drive through appropriate mechanical drive connections shown at 134 for the various components of the system. Thus, it is contemplated that there be provided a low speed motor 136 which will run continuously and a high speed motor 137 which will be operated selectively. Also, electric clutches are provided including a spindle clutch 138 and a spindle clutch 139 and a low speed clutch 140.

In order to provide direct current for use in energizing the clutches, a rectifier 141 is provided connected in circuit with a variable direct current power pack or power supply 142 such as that comercially available under the trade name "Statotrol."

The control knob 132 is connected to the movable element 143 of an adjustable potentiometer 144 and is also connected to a series of control switches indicated at $S_1$, $S_2$, $S_3$ and $S_4$. Thus, by turning the knob 132 either to the left or to the right at approximately 7° of angular movement away from the "off" position, spindle clutch 138 or spindle clutch 139 is cut in. At "off" position the low speed clutch 140 and the slow motor 136 are both "on," and a relay 146 controlled by switch $S_1$ operates to cut out the high speed motor 137. This occurs by the actuation of switch 136 to "on" position.

At approximately 15° of angular movement of the adjustment knob 132, one of the corresponding spindle clutches 138 or 139 is cut out, as well as the slow motor clutch 140.

Then, as the knob 132 is adjusted between aproximately 15° and 105° of angular motion, variable speeds are attained by adjustment of the movable member 143 of the potentiometer 144, thereby varying the energization of the low speed windings of the high speed motor 137.

At 105° of angular movement, the top limit of the slow motor 136 is attained and that motor is shut off by disengaging the main shaft slow motor clutch 140. A 5° detent stop position is then provided and at 110° of angular motion, the high speed motor 137 is picked up. Between 110° and 120° of motion, an override functions, thereby transporting the film at high speeds.

Referring more specifically to FIGURE 13, it will be noted that a spindle is provided at 150 and has a spindle key 151 spring-biased radially outwardly thereof for engagement with a corresponding spool or a corresponding core and shell as provided in accordance with the principles of the present invention. The spindle 150 extends through an aperture 152 formed in the deck 32.

Below the level of the deck 32 there is provided a housing 153 having spaced bearing means 154 and 156 for journaling a spindle shaft 157. The spindle 150 is connected to the spindle shaft 157 by means of a drag brake drum 158. The tension on the drag brake drum 158 may be varied by adjusting a continuous biasing means 159 having one end bottomed against an adjustable member 160 locked in adjusted position by a set screw 161 mounted in a bracket 162 carried in firm assembly by the housing 153 by means of an adjustable screw 163.

The spindle shaft 157 is driven rotatably by a clutch assembly including a first driving part 164 pinned to the spindle shaft 157 by a driving pin 166 and having a radial clutch surface 167. The clutch surface 167 engages with a driving gear 168 having teeeth 169 engaging with a helical drive 170 connected co-rotatably with a main shaft 171.

The main shaft 171 is rotatably driven through a clutch having first and second parts 173 and 174 pinned to the shaft 171 as at 176 and 177. A pulley belt 178 is trained over the clutch and is driven by a pulley hub 179 connected to the drive shaft 180 of the high speed motor 137.

The low speed motor 136 has a drive shaft 181 which rotatably drives a gear 182 in mesh with a mating gear 183 connected to the end of the shaft 171 through a coupling shown generally at 184.

In operation, the gear 168 is in free wheeling relationship to the spindle shaft 157. When the electric clutch rotor pulls down the clapper, 167, the spindle shaft 157 is then rotatably driven so that the spindle 150 will be rotated.

The pulley 178 takes the form of a toothed timing pulley, thereby eliminating erratic action and moving the film smoothly and properly across the aperture plate 72.

By employment of the slip clutch, even though the high speed motor 137 is in operation, as the ends of the film are neared, the rate of transport will be slowed down, thereby preventing the film from slamming home with possible detrimental effects to the apparatus and the film.

In order to control screen brightness, a brightness control knob 190 is provided on the left-hand side of the machine and has three levels; low, medium and high. These settings correspond to three taps on a transformer 191 (FIGURE 14) connected in circuit with the light source 42. Thus, the brightness control 190 may be utilized to compensate for varying line voltage and for variable magnification. At 40×, the screen 28 is approximately one-quarter of the brightness of 20×. Accordingly, the operator is afforded the opportunity of adjusting the brightness to suit his requirements.

Figure 15:
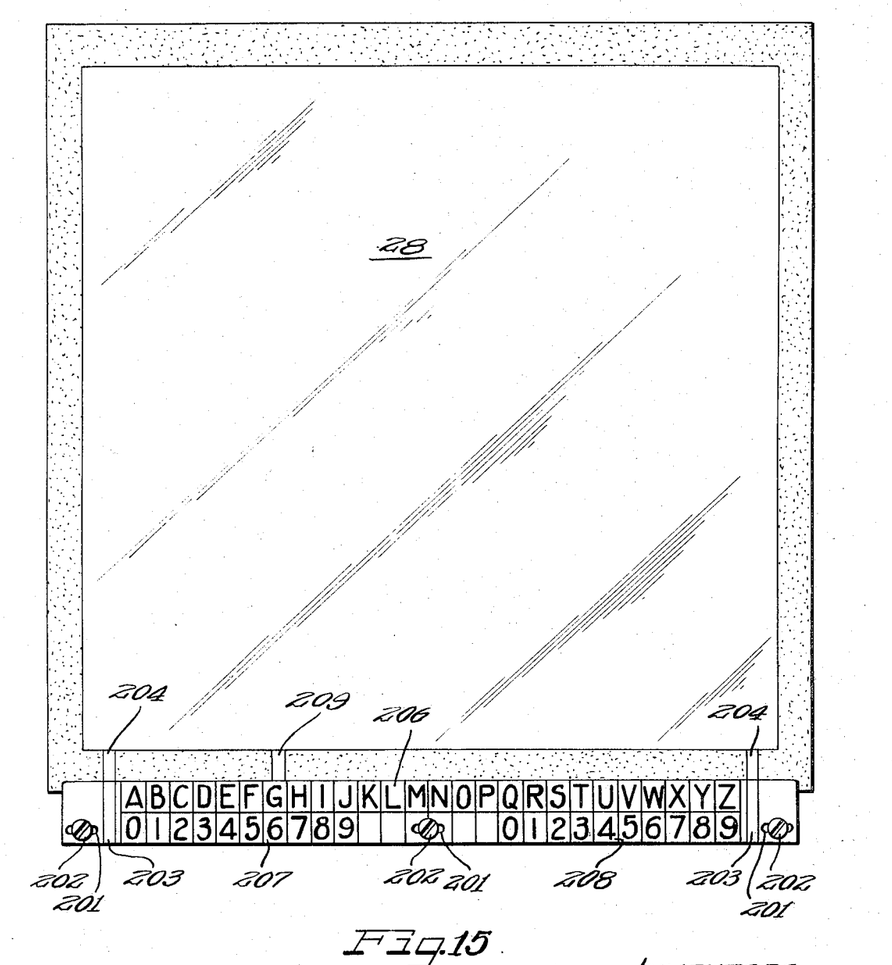
FIGURE 15 shows the front of a screen with a stripe look-up indexing arrangement.

Referring now to FIGURE 15 in conjunction with FIGURE 1, it will be noted means are provided affording a stripe look-up indexing arrangement. Generally, two methods of indexing may be used with the machine 20, either a roll diameter reference or a stripe look-up. A roll diameter reference may be established by using reference marks related to the roll diameter in the cartridge 60. Such marks may be placed on a tape adhered to a translucent window 200 in the cover 64 of the cartridge 60. For example, marks placed approximately one-eighth inch apart will represent approximately 500 image pages on the film F.

In the stripe look-up arrangement of FIGURE 1 and FIGURE 15, the stripes are read in relation to a scale fixed on either side of the screen 28 for horizontal motion, or on the bottom of the screen 28 for vertical motion. The stripes may consist of one or more rows, depending upon the number of scales required. In FIGURE 1, the scale plate 41 is shown provided with a plurality of slotted openings 201 through which extend fasteners 202 whereby the scale plate may be adjusted in reference to the screen 28.

At opposite ends of the scale plate there is provided a synchronization stripe 203. The synchronization stripes 203 are used for adjusting a projected image to the proper scale length by using the continuously variable zoom adjustment 121. Thus, when an image is projected on the screen 28 corresponding limit stripes 204 will be projected on the screen adjacent the image area and the stripes 204, 204 can be aligned with respect to the sync stripes 203, 203, thereby insuring that the projected image is at the proper scale length.

In the scale shown in FIGURES 1 and 15, there are two rows of indicia consisting of 26 letter indicia in a top row 206 and two separate banks 207 and 208 of number indicia 0–9, inclusive, in the bottom row. A film stripe is shown at 209 on FIGURE 15 opposite the location "G6."

Figure 16:
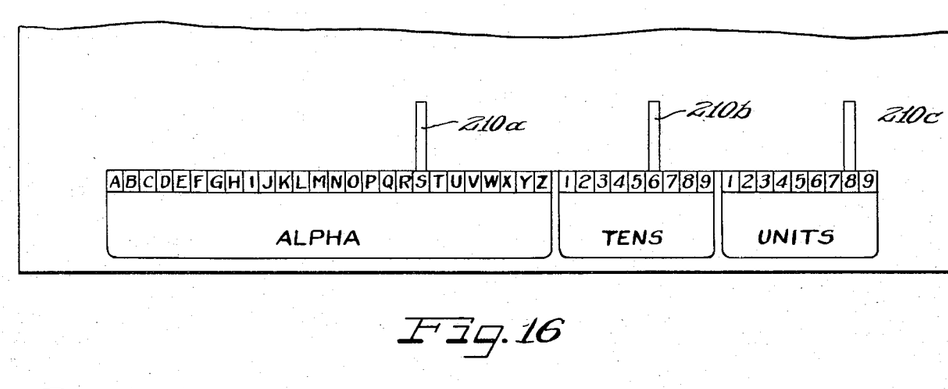
FIGURE 16 shows an alternative indexing scale utilizing a letter designator and two decade number index.

An alternative scale arrangement is shown in FIGURE 16 where there is provided three banks of designations in a single row consisting of an "alpha" bank of 26 letters, a "tens" bank of numbers 1–9 and a "units" bank of numbers 1–9. Three exemplary film marking stripes 210a, 210b and 210c are shown on the scale of FIGURE 16 indicating a coded location of a specific image at "S68."

Figure 17:
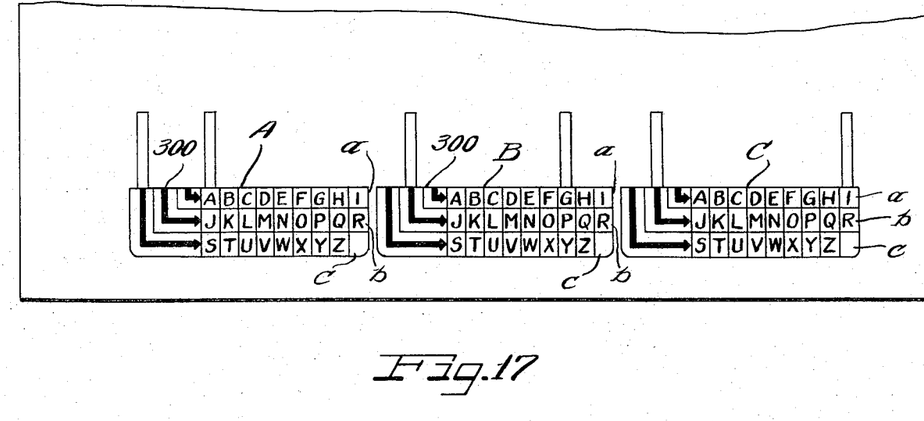
FIGURE 17 shows a three-scale multiple letter index.

If additional index sites are desired or required, an index, as shown in FIGURE 17, may be provided wherein there are provided multiple banks each containing multiple rows of indicia designators. In the exemplary form of FIGURE 17, there is provided banks A, B and C each having three separate rows of letters a, b and c. Additionally, each row *a, b* and *c* has an indexing zone shown at 300 consisting of three spaced segments. Thus, a code stripe on the film will be located in the index zone 300 of each bank A, B and C in order to select the appropriate row and a second code stripe associated with each bank A, B and C will be located opposite a corresponding longitudinal position to designate the specific letter. In the exemplary illustration of FIGURE 17, there is designated the image bearing the identification of "SPR."

In operation, a cartridge 60 is selected from storage and is snapped on into position on the control deck 32 by engagement with the spindles 150. Threading is unnecessary since the film extends across the aperture plate 72 and immediately registers with the optical track, thereby projecting an image on the screen 28 when the on-off switch 136 is moved from the off position to the drive and to the lamp position.

If necessary, the focus knob 130 is adjusted to present a sharp focus and the sides of the image being viewed may be selectively adjusted by variation of the continuously variable zoom adjustment 121. The brightness of the image may also be selectively adjusted through manipulation of the brightness control 190.

As soon as the image is projected on the screen, the particular image on the screen will be identified by reference to the scale plate 41 and the operator will immediately known which direction to transport the film in order to get to the specific image being retrieved. Since rewinding is not necessary, the operator has only a relatively small distance to go and the transport knob 132 is then selectively adjusted either to the left or to the right to transport the film either at a low variable speed, at a stop or at a high speed. If facsimile copy is desired, the swinging mirror 49 is adjusted out of the optical track by operating the handle 51 so that the image will be projected to a glass platen at the top of the machine. When usage is completed of the cartridge 60, it is merely removed from the deck 32 without the necessity of rewinding and returned to storage.

Although minor modifications might be suggested by those versed in the art, it should be understood that we wish to embody within the scope of the patent warranted hereon all such modifications as reasonably and properly come within the scope of our contribution to the art.

We claim as our invention:

1. A microfilm reader comprising
a cabinet having a vertically disposed screen for viewing an image,
a light source in said cabinet,
and an optical track between said screen and said light source comprising
lens system for varying the magnification of the image while maintaining precision focus comprising continuously variable magnification zoom lenses continuously adjustable axially and means for axially adjusting said lenses for variable magnification between 20× and 40×, and a no-rewind cartridge for inserting a roll film into projecting relation with the optical track, said cartridge comprising an integral container having upper, lower and side walls and including two hubs spaced apart less than twice the radial dimension of the accumulated film and having means forming a film plane aperture through which the film passes from one hub to the other.

2. A microfilm reader as defined in claim 1 and further characterized by the utilization of a dove prism in said optical track for selectively rotating the image on the screen through a full range of 360°.

3. A microfilm reader as defined in claim 1, and electrical circuit means for energizing said light source including a brightness control comprising a transformer having multiple taps for furnishing current to said light source at output voltages corresponding to different degrees of desired screen brightness.

4. A microfilm reader as defined in claim 1 and means for supplying selected varying output voltage to said light source to compensate for varying voltages, variable magnifications, different film densities and operator preference.

5. A reader for viewing microfilm comprising a cabinet having an upright viewing screen in a front wall thereof,
a lens system projecting forwardly and rearwardly through said front wall below the level of said screen,
a forwardly projecting housing on said cabinet for enclosing said lens system and forming a horizontal loading deck and control panel for said reader, a light source in said housing,
a mirror projection system in said housing and in said cabinet for projecting rays of light from said light source to said screen including a light source mirror in said deck aligned with said lens system,
a power driving means including two spindles projecting upwardly through said deck,
and a film cartridge mounted on said two spindles and having a film plane aperture registering with said light source mirror to project images appearing at said film plane aperture on said screen,
said lens system comprising continuously variable magnification zoom lenses affording continuously variable magnification between 20× and 40×.

6. A reader as defined in claim 5 and further characterized by adjustable control means for said light source to effect low, medium and high screen brightness, thereby compensating for varying voltage and magnification as well as different film densities.

7. A reader as defined in claim 5 wherein said cartridge comprises a no-rewind cartridge for inserting a roll film into projecting relation with the optical track,
said cartridge having integral upper, lower and side walls forming an integral container and including two hubs spaced apart less than twice the radial dimension of the accumulated film in the cartridge and having means extending generally across the area between said two heads and forming a film plane aperture through which the film passes from one hub to the other.

8. A reader for viewing microfilm comprising a cabinet having an upright viewing screen in a front wall thereof,
a lens system projecting forwardly and rearwardly through said front wall below the level of said screen,
a forwardly projecting housing on said cabinet for enclosing said lens system and forming a horizontal loading deck and control panel for said reader, a light source in said housing,
a mirror projection system in said housing and in said cabinet for projecting rays of light from said light source to said screen including a light source mirror in said deck aligned with said lens system, a power driving means including two spindles projecting upwardly through said deck,
and a film cartridge mounted on said two spindles and having a film plane aperture registering with said light source mirror to project images appearing at said film plane aperture on said screen,
said lens system including a dove prism for effecting 360° image rotation,
and means for rotating said dove prism including detent means providing click stops for every 90° of rotation.

9. A reader for viewing microfilm comprising
a cabinet having an upright viewing screen in a front wall thereof,
a lens system projecting forwardly and rearwardly through said front wall below the level of said screen,
a forwardly projecting housing on said cabinet for enclosing said lens system and forming a horizontal loading deck and control panel for said reader,
a light source in said housing,
a mirror projection system in said housing and in said cabinet for projecting rays of light from said light source to said screen including a light source mirror in said deck aligned with said lens system, a power driving means including two spindles projecting upwardly through said deck,
and a film cartridge mounted on said two spindles and having a film plane aperture registering with said light source mirror to project images appearing at said film plane aperture on said screen,
said cartridge comprising a body,
a cover for said body,
snap removal mounting means connecting said cover to said body,
a pair of guide rollers in said cartridge, means forming an aperture plate in said cartridge,
two loose cores and shells for attachment to the opposite ends of a film to be stored in said cartridge, said cores and shells together with one another forming hubs for engagement with a film driving power source,
and means retaining said hubs on spaced rotational axes,
the spacing dimension of said axes being less than twice the radial dimension of accumulated film on said hubs.

10. For use in a microfilm reader,
a cartridge having a body,
a cover for said body,
snap removal mounting means connecting said cover to said body,
a pair of guide rollers in said cartridge,
means forming an aperture plate in said cartridge extending generally across the area between said guide rollers over which the film is guided,
a pair of hub assemblies each comprising,
    a core and separable shell for attachment to opposite ends of a film to be stored in said cartridge,
    and means retaining said hub assemblies on spaced rotational axes for engagement with a film driving power source, the spacing dimension of said axes being less than twice the radial dimension of accumulated film on said hubs.

11. A film cartridge comprising
upper and lower parallel walls separated by a side wall,
a pair of hubs extending between said parallel walls and spaced from one another,
    said cartridge having means forming a film plane aperture
    the side wall being spaced outwardly of said hubs on opposite sides less than twice the diameter of the film spools,
whereby film can be stored and used in said cartridge without necessitating removal therefrom,
    each of said hubs comprising a core and shell fastening means for the film including a core having a spindle aperture formed therein, means on said core separable from said spindle for drivingly engaging said spindle and a shell having a recess for receiving the core with the free end of the film wrapped thereon in clamping relation,
    said core and said shell together forming a film hub and having complementary axially extending abutment surfaces configured to rotate said core and said shell in unison with one another.

12. A film cartridge as defined in claim 11 wherein said shell is a C-shaped member and the surface of said recess and said core engage the film in clamping relation substantially uniformly throughout the circumference of the complementary surfaces of said core and said recess.

13. A core and shell fastening means for a film comprising
a core having a spindle aperture therein,
means on said core separable from said spindle for drivingly engaging said spindle,
and a shell having a recess therein for receiving the core with the free end of a film wrapped thereon in clamping engagement,
said core and said recess having complementary flat surfaces thereon to prevent relative rotation therebetween.

14. A transport system for microfilm reader comprising,
a low speed motor,
a high speed motor,
a pair of spindle assemblies to be driven by said motors,
and a control system for connecting said motors to said spindle assemblies with continuously variable speed and direction comprising,
    a single control knob having a center stop position,
    and circuit means controlled by said knob including switches and a potentiometer to provide variable slow speed of said low speed motor with said high speed motor cut out,
    an additional stop position between low speed and high speed positions of said knob and a high speed of said high speed motor with said low speed motor cut out.

15. A transport system as defined in claim 14 wherein each of said spindle assemblies comprises
a spindle,
a spindle shaft,
a drag brake means interconnecting said spindle shaft and the spindle,
a gear on said spindle shaft in free wheeling relation,
and a spindle clutch connected to said spindle shaft and engageable with said gear,
and means to selectively drive said gears in selected opposite directions,
thereby to control the transport of spooled microfilm between the spindles,
said drag brake means operating to safeguard the film against undue stress near the end of travel of the film.

16. A transport system as defined in claim 14 and a no-rewind cartridge on said spindle assembly comprising
an integral container having upper, lower and side walls and including two hubs spaced apart less than twice the radial dimension of the accumulated film and having means forming a film plane aperture through which the film passes from one hub to the other.

17. A microfilm reader for looking up and reading microimages on spooled film by a code stripe look-up including code stripes on said film comprising a screen having a stripe look-up scale code comprising
a series of marks for denoting successive longitudinal sections of film strip in the reader,
    each series of marks having two distinct components including two separate and distinct elements consisting of
an inner row having a series of letter indicia, and two separate banks of number indicia in an outer row,
whereby multiple marks on the film strip whereby when said film strip is moved rapidly in a given area of view, said marks on the film strip will appear opposite corresponding portions on said rows and banks to identify the location of adjacent images on the film strip.

18. A microfilm reader for looking up and reading microimages on spooled film by a stripe look-up including synchronization stripes on said film comprising
a screen,
an optical track for projecting an image on the screen,
a scale fixed on one side of the screen, and a continuously variable zoom lens in said optical track, said scale having a pair of spaced synchronization stripes, means for adjusting said zoom means for changing the size of the film image, whereby said projected image may be adjusted until the synchronization stripes on said film coincide with said synchronization stripes on said scale.

References Cited

UNITED STATES PATENTS

| | | | |
|---|---|---|---|
| 2,508,651 | 5/1950 | Pratt et al. | 242—74 |
| 2,569,918 | 10/1951 | Berggren | 88—24 |
| 2,692,529 | 10/1954 | Halahan et al. | 88—24 |
| 2,707,222 | 4/1955 | Brown et al. | 116—124.2 |
| 2,718,361 | 9/1955 | Evraets | 242—55.11 |
| 2,746,344 | 5/1956 | Pratt et al. | 88—24 |
| 2,761,351 | 9/1956 | Gehring et al. | 88—24 |
| 2,782,680 | 2/1957 | Howell | 88—24 |
| 2,933,978 | 4/1960 | Rosenthal | 88—24 |
| 3,043,187 | 7/1962 | Shaffer | 352—72 |
| 3,157,880 | 11/1964 | Easterly et al. | 352—72 |
| 3,161,105 | 12/1964 | Offensend | 88—24 |

NORTON ANSHER, *Primary Examiner.*

RICHARD SHEER, *Assistant Examiner.*